United States Patent
Wagner

(10) Patent No.: US 6,446,662 B1
(45) Date of Patent: Sep. 10, 2002

(54) DEVICE FOR DRILLING OR PLUGGING A HOLE IN A SEALED FLUID CONTAINER OR CONDUIT WALL

(76) Inventor: Dennis J. Wagner, 63 Wilson La., Bethpage, NY (US) 11714

( * ) Notice: Subject to any disclaimer, the term of this patent is extended or adjusted under 35 U.S.C. 154(b) by 0 days.

(21) Appl. No.: 09/592,635

(22) Filed: Jun. 13, 2000

(51) Int. Cl.[7] .......................... F16K 43/00; F16L 41/04; F16L 41/16; F16L 55/132
(52) U.S. Cl. ...................... 137/318; 137/15.14; 138/94; 138/97
(58) Field of Search .............................. 137/318, 15.14; 138/94, 97

(56) References Cited

U.S. PATENT DOCUMENTS

| | | | |
|---|---|---|---|
| 1,850,040 A | 3/1932 | Turner | 138/94 |
| 2,170,866 A | 8/1939 | McAllister | 138/94 |
| 2,763,282 A | 9/1956 | Reedy et al. | 137/318 |
| 2,911,859 A | 11/1959 | Longley et al. | 137/318 |
| 3,275,023 A | 9/1966 | Raspante | 138/94 |
| 3,473,555 A | 10/1969 | Martin et al. | 137/315.42 |
| 3,773,067 A | * 11/1973 | Ray | 137/318 |
| 4,019,541 A | 4/1977 | Koppl | 138/94 |
| 4,127,141 A | 11/1978 | Ledonne et al. | 137/318 |
| 4,184,504 A | 1/1980 | Carmichael et al. | 137/318 |
| 4,239,055 A | 12/1980 | Van Coffman | 138/94 |
| 4,503,879 A | 3/1985 | Lazarus | 138/94 |
| 5,058,519 A | 10/1991 | Collins | 29/402.09 |
| 5,099,868 A | 3/1992 | Weber | 138/94 |
| 5,152,311 A | 10/1992 | McCreary | 138/97 |
| 5,511,578 A | 4/1996 | Wagner | 137/318 |
| 5,560,388 A | * 10/1996 | Caldwell | 137/318 |
| 5,590,676 A | * 1/1997 | Wagner | 137/318 |

* cited by examiner

Primary Examiner—George L. Walton
(74) Attorney, Agent, or Firm—Morgan & Finnegan, LLP

(57) ABSTRACT

The device of the invention comprises a combination hand cylinder drill and tool for installing a stopper plug for drilling and/or plugging a hole in a sealed fluid container. The stopper plug aspect of the invention is used to insert and secure a stopper plug to close a hole in the wall of a storage container or a pipe carrying fluid under pressure. This permits removal of a defective pipe fitting such as a tee or a valve. The stopper plug includes a toggle or anchor for engaging the inner wall of the pipe at the location of the hole to be sealed shut. After the stopper plug is secured in place, the defective fitting is removed. The drill aspect of the invention is used to drill out a cylindrical hole in the pipe and/or fitting so that the plug can be installed.

23 Claims, 10 Drawing Sheets

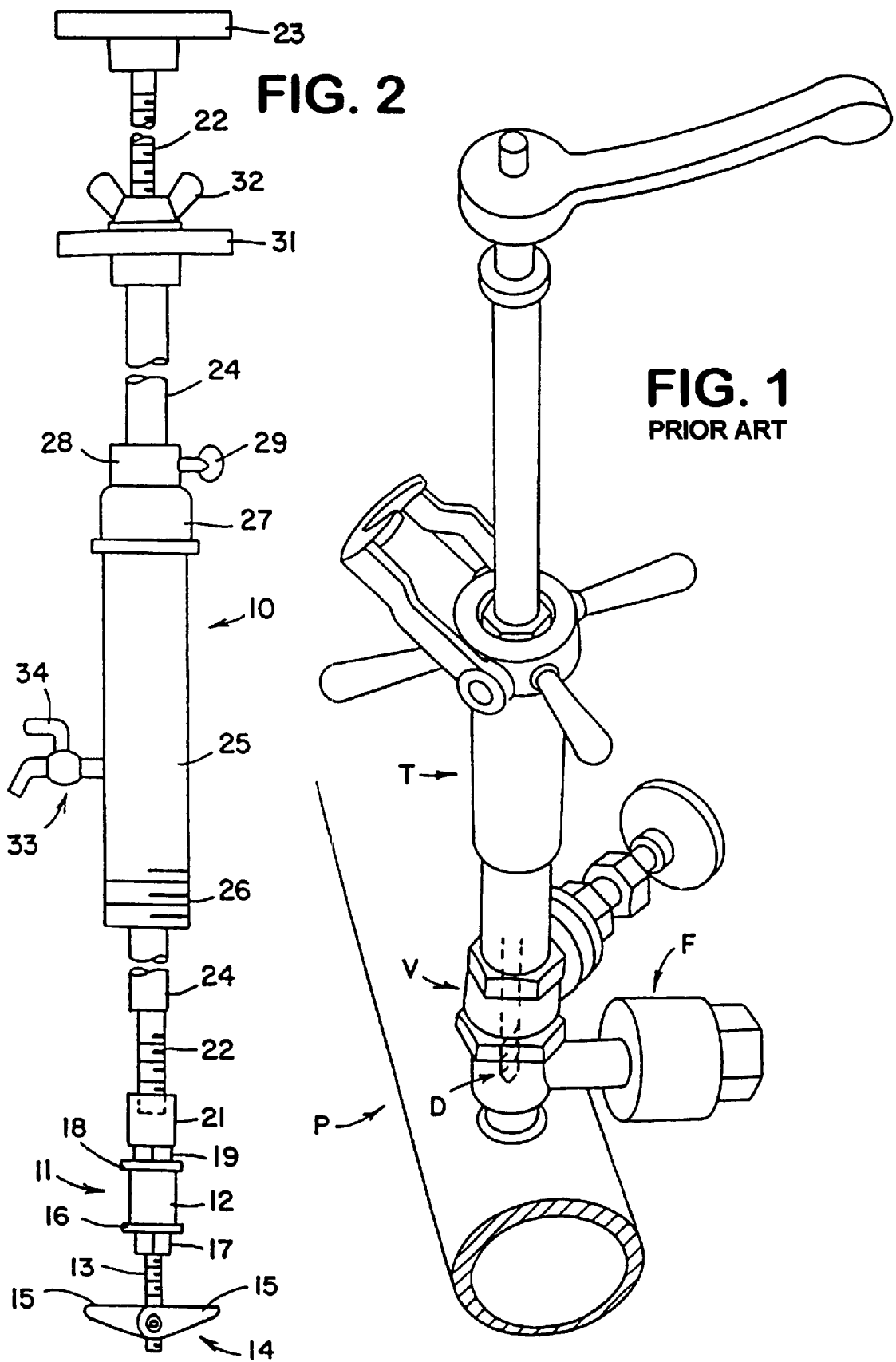

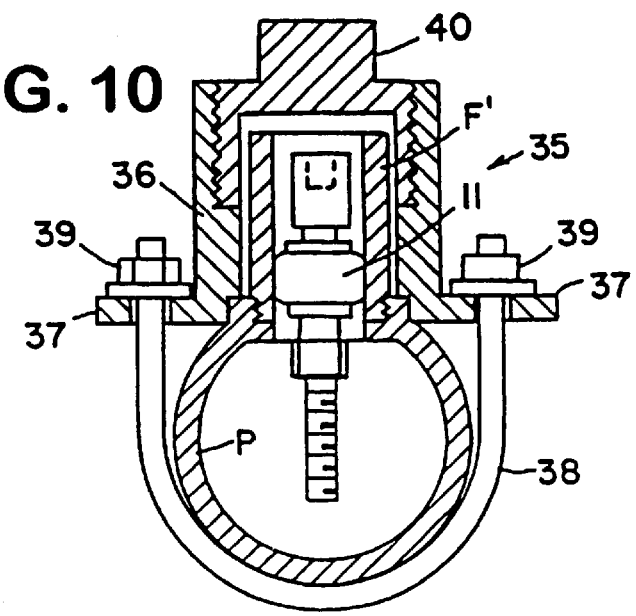
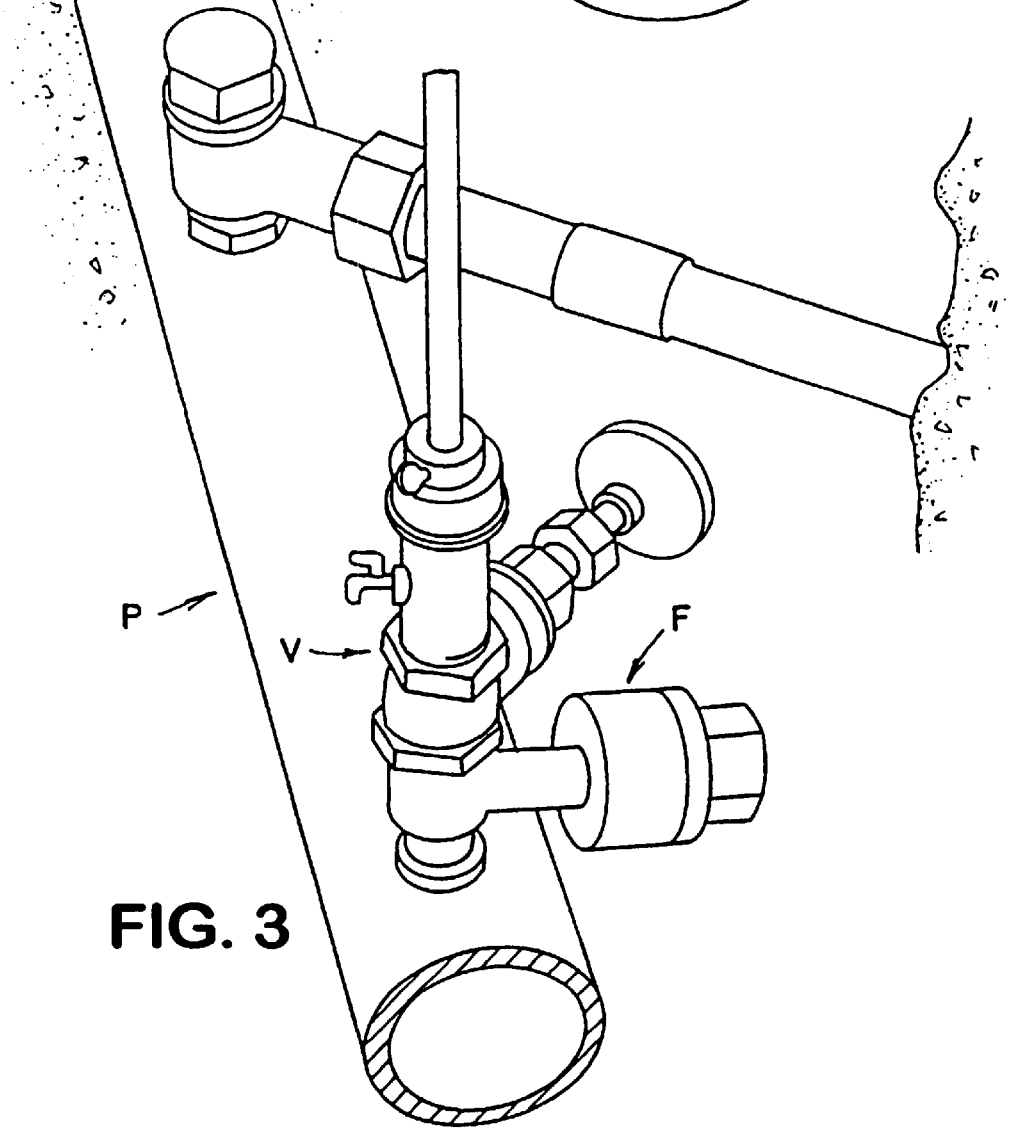

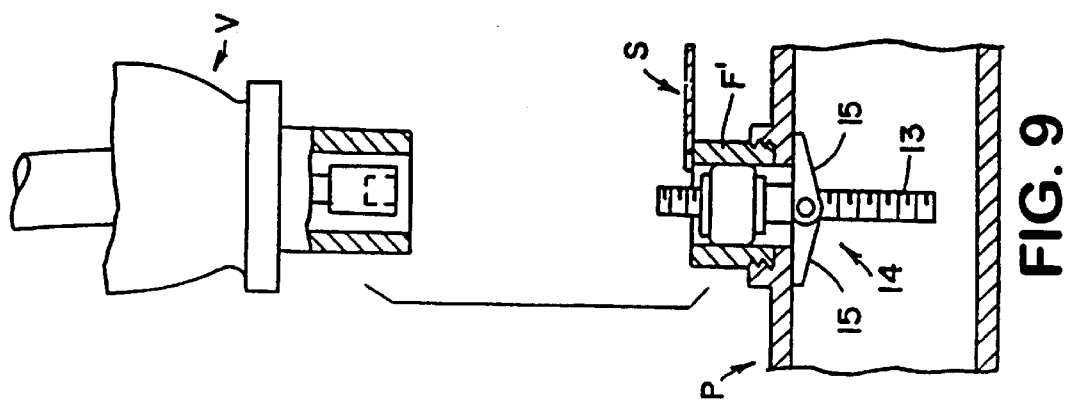
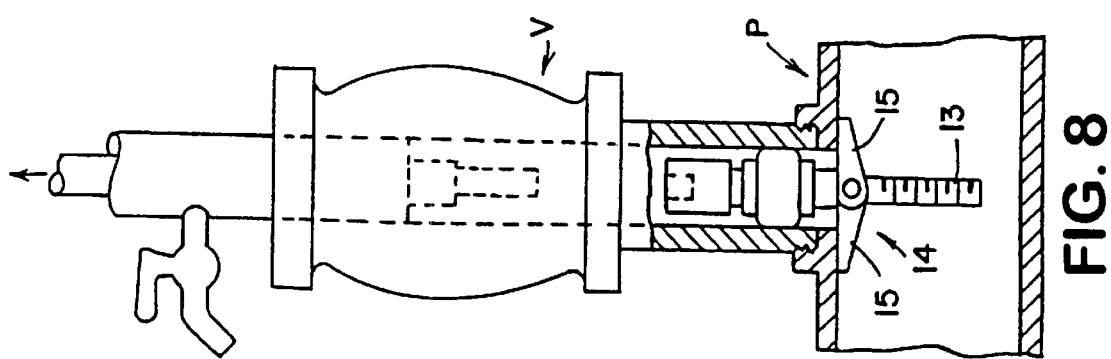
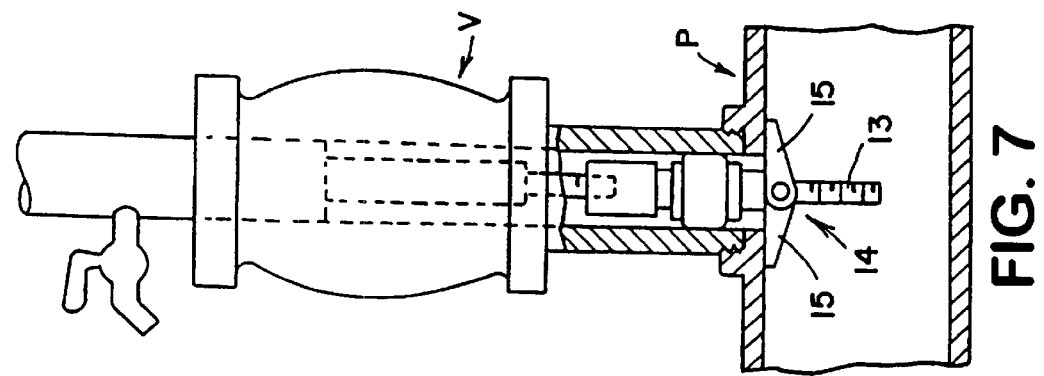

DEVICE FOR DRILLING OR PLUGGING A HOLE IN A SEALED FLUID CONTAINER OR CONDUIT WALL

BACKGROUND OF THE INVENTION

The present invention relates to the drilling of sealed fluid containers such as low or high pressure gas mains, storage tanks and the like and the installation of a permanent stopper or plug for preventing the escape of fluid under pressure from a sealed container. A combination hand cylinder drill for drilling fluid containers and a tool for inserting a stopper in a hole through the container wall to prevent the escape of fluid is provided.

DESCRIPTION OF THE PRIOR ART

The pipe fittings installed in underground systems for the delivery of gas to residential and commercial users can, over time, develop leaks which require the attention of gas utility companies. Fittings such as pipe tees connected to pipe mains that carry gas under pressure which can be as low as one quarter pound or as much as fifty pounds per square inch or more can become so worn or damaged as to permit leakage of substantial volumes of gas to the atmosphere, creating an environmental hazard and posing a risk of explosive combustion. Such leaks must be promptly sealed, preferably without interruption of service to gas consumers. Similarly, fittings in a wide array of fluid container applications such as, e.g., petrochemical or water transmission lines, storage tanks or the like may develop leaks or become less than fully functional. Such fittings need to be replaced without interrupting service or draining storage reservoirs.

One solution to the problem of pipe leakage in the past has been to excavate a trench extending in both the upstream and downstream directions from the leak and cutting off gas flow through the pipe after installing a bypass and welded fittings to remove and replace the section of pipe to which the leaking fitting is connected. Alternatively, there are devices for installation in the pipe both upstream and downstream of a leaking fitting which serve temporarily to interrupt fluid flow while a pipe section that includes a leaking fitting is disconnected at both ends and replaced with or without a new fitting. Both of these prior art approaches are time and labor consuming.

Other methods of replacing leaking pipe fittings are known which allow fluid under pressure to escape to the atmosphere while the leaking valve or other fitting is being replaced. In the case of natural gas or petrochemical pipelines, for instance, such methods require special equipment such as fire resistant clothing and respirators for the workers, and the released gas or other flammable or explosive fluid constitutes a safety hazard.

U.S. Pat. No. 2,763,282 describes a pipe stopper fitting which, when installed, completely closes off the internal passage through a pipe and shuts off gas flow through the pipe.

Devices for sealing an opening in a pipe wall during removal of a pipe fitting are shown in U.S. Pat. Nos. 4,127,141; 4,239,055 and 5,099,868 . The arrangements of all of these patents involve the installation of temporary pressure plugs made of rubber or other compressible material to provide a gas-tight seal for a hole in a pipe wall. The pressure plugs of these three patents are removed from the pipe after use, and are not intended to be left permanently in place. Removal of the pressure plugs when the pipe has been provided with a new fitting or a pipe saddle not only takes time but also leaves some uncertainty about the possibility of leakage after pipe repair has been completed.

Also, my U.S. Pat. No. 5,511,578 , incorporated herein by reference, describes and claims a tool for installing a stopper in a gas conduit wall. The use of the tool of U.S. Pat. No. 5,511,578 for repairing a leak such as a leaking fitting in a pressurized pipe for supplying gas under pressure produces a permanent internal seal at a hole in the pipe section that has been repaired in addition to the external seal provided by a plug held in place on the pipe section by a saddle or the like. The invention of U.S. Pat. No. 5,511,578 provides a method for sealing an opening through the side wall of a linear pipe section, such as a main carrying gas under pressure. Such a seal is required when a defective pipe fitting such as a tee or a valve must be removed. The valve or tee or other fittings has a passage that extends at an angle of 90 degrees to the axis of the pipe to which the fitting is attached. The fitting to be removed is also adapted for installation of a gate valve or the like which also has a cylindrical passage that forms a linear continuation of the passage through the fitting. Thus, when a gate valve is mounted on the pipe fitting which is to be removed, there is a continuous passage through the fitting and the gate valve extending radially at a right angle to the axis of the pipe section. The tool of the invention serves to insert a stopper plug through this passage to the location of the hole in the pipe section side wall that is to be sealed. The tool can be safely used without the need for workers to wear protective clothing or gas masks while the pipe under repair continues to carry a flow of gas under pressure. The tool is of simple, reliable construction and easy to use. However, a separate tool is required to drill a hole, if necessary, before the hole is plugged.

The present invention provides a tool for drilling a hole in a fluid container such as a gas main and for then inserting a stopper through the drilled hole. The present invention provides for an advance over prior art tapping or drilling devices in that only one tool may be used both to drill and plug the hole.

SUMMARY OF THE INVENTION

The present invention is a combination device comprised of a hand cylinder drill used for drilling sealed fluid containers such as low or high pressure gas mains, storage tanks and the like and for use in inserting a stopper in the drilled hole through the container wall to prevent the escape of fluid under pressure from the sealed container.

The hole plugging aspect of the present invention is used to insert a stopper plug into a hole in a fluid container wall. The stopper plug includes a compressible, elastomeric, generally cylindrical sealing member. The sealing member expands radially when axially compressed, to close the hole tightly against the escape of gas under pressure from within the pipe. Compressive force is applied to the stopper plug by the cooperation of threads on a rod member which extends axially through the stopper plug with a toggle or anchor that has a pair of wings that extend to engage the inner wall of the pipe upon rotation of the threaded rod. When the expanded plug stopper is securely in place, sealing the hole, the threaded rod-like member is separated from the elongated shaft which had served to rotate the stopper plug, leaving the stopper plug in place, sealing the hole. The defective fitting is removed, for example, by sawing the fitting off. In the case where the hole that is plugged is in a pipe side wall, a pipe saddle, clamp or other fitting, which can receive a rigid plug, is then secured around the pipe at the location of the internally sealed hole to provide a permanent external closure of the hole and to serve as an additional restraint against movement of the stopper plug.

The rotatable shaft that is used to rotate the rod member of the stopper plug extends through a threaded, cylindrical nipple member or housing which can be threadedly secured to a shut off valve that has been attached to the leaking fitting so that leakage does not occur while the stopper plug is being positioned and secured in the hole in the pipe wall. The nipple preferably has a stopcock for bleeding off whatever gas is contained in the nipple. Cessation of fluid flow from the stopcock shows that the hole has been sealed and relieves pressure from the housing to facilitate safe removal of the tool from the fitting or valve.

The rotatable shaft has attachment means, which may be internal threads, for removable attachment to the socket. The rotatable shaft also has attachment means, which may be external threads, for removable attachment to a drill bit or hole saw cutter.

The shaft is provided at its end remote from the stopper plug with a handle for manual rotation of the shaft to open the wings of the toggle and compress the elastomeric member so that it expands radially to seal the hole. The shaft is also provided with means remote from the drill bit for connection to a handle or power device for manual or powered rotation of the shaft and a drill bit.

The first step in the operation of a tool in accordance with the invention is to attach a gate valve or the like to the pipe fitting that is to be removed. Then after drilling or sawing the container wall with the drill aspect of the invention, if necessary, to ensure that the hole to be plugged is circular, the stopper plug is inserted through the gate valve and the fitting. The stopper plug has a toggle that engages the inner wall of the pipe or container wall section. A radially expanding body of the stopper plug is expanded in place to close the hole against the escape of the fluid contents of the pipe or container. The tool is removed, leaving the stopper plug in place and the fitting is cut off just above the location of the stopper plug, leaving a stub of the removed fitting on the pipe. In the case of a pipe, a clamp, saddle, collar or similar known device is installed around the pipe section and around the stub of the fitting that has been removed.

The combination drill and stopper installation tool eliminates the need for repair personnel to carry two different tools for the drilling and installation procedures. The present invention also is an advance over prior art drilling, tapping or plugging devices in that a bypass valve is optionally provided to equilibrate fluid pressure on either side of the drill face so that, in the case of high pressure fluids, insurmountable resistance is not encountered to applying the drill surface to the material to be drilled.

BRIEF DESCRIPTION OF THE DRAWINGS

FIG. 1 illustrates the preparation of a pipe section for the installation of a stopper plug using a prior art tapping or drilling device.

FIG. 2 is a side view of one embodiment of a tool and stopper plug according to the invention.

FIG. 3 shows how the tool of the invention is used in conjunction with a valve temporarily secured to a pipe fitting for the insertion of a drill bit to drill a hole or a stopper plug to seal a hole in a pipe wall.

FIG. 7 shows the stopper plug in place in its final position.

FIG. 8 shows how the stopper plug is separated from the tool after the plug has been installed and locked in place.

FIG. 9 illustrates the cutting off of a pipe fitting, leaving a stub in place around the stopper plug.

FIG. 10 is a view in partial section taken along the axis of a pipe section showing a saddle and plug secured around the pipe section.

DETAILED DESCRIPTION OF PREFERRED EMBODIMENTS

Figure 2A:
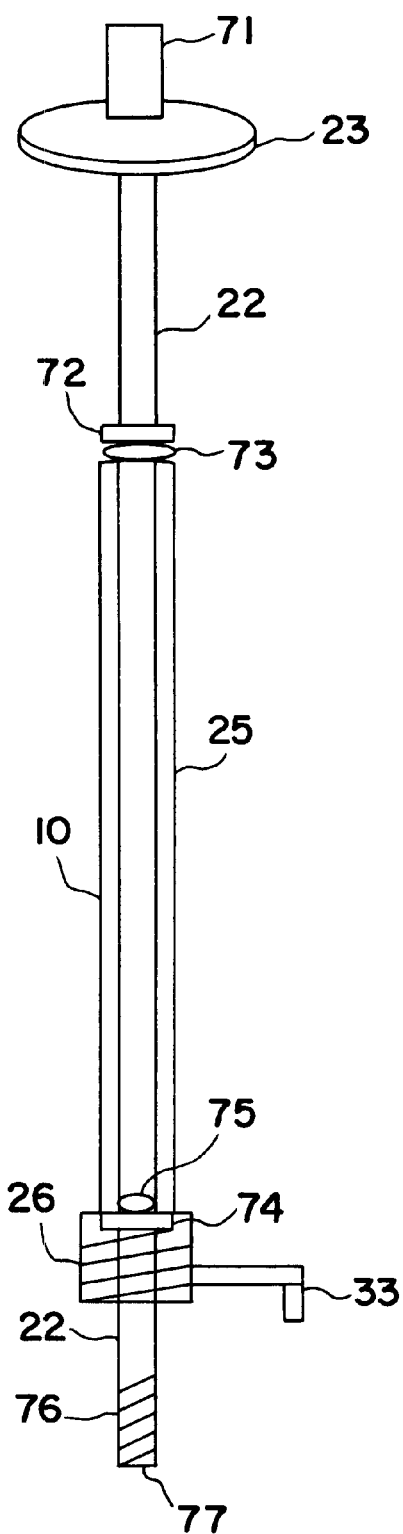
FIG. 2A is a side view of one embodiment of the invention showing the cylinder and elongated shaft.

FIG. 1 illustrates a way in which a pipe section generally designated P equipped with a fitting F, illustrated as a service tee, can be prepared for use of the tool of the invention to insert a stopper plug that remains in place after removal of the fitting F.

The invention is described as applied to the repair of a leak resulting from a defect in a fitting in a piping system for the supply of natural gas to a residential or commercial consumer, but it will be understood that the invention is more generally applicable to the drilling of a hole and/or installation of a stopper plug to close a hole in a fluid container or the sidewall of a conduit carrying any of many different fluids under pressure. The invention in its most general form is applicable to low pressure fluid containers as well as to high pressure conduits and the like, i.e., sealed or pressurized fluid containers or conduits such as liquid storage containers, high and low pressure natural gas storage systems or pipelines, chemical, water, waste, oil or other petrochemical storage or transmission systems etc. In accordance with the invention, a leaking fitting is drilled to circularize the hole, if necessary, and then plugged. The external part of the fitting is then removed and the fitting is thus replaced by a permanent closure of the hole in the pipe sidewall.

The preparatory procedure shown in FIG. 1 was previously known and can be used to assure that a hole through the wall of the pipe P has a circular shape, since for any of a number of reasons, the hole to be plugged may have an elongated or irregular shape which could result in less than optimum sealing of the hole by application of the invention. Thus, FIG. 1 shows a gate valve generally designated V of well known structure and function secured in place atop the fitting. A prior art tapping or drilling device, designated by the reference character T, is mounted atop the gate valve V as shown in FIG. 1. The gate valve is opened and the tapping or drilling device T is used to enlarge the existing hole in the pipe side wall, producing a uniformly circular hole. The drill bit D is then withdrawn, the gate valve V is closed and the tapping or drilling device T is removed.

The present invention, in addition to plugging the hole after drilling, may be used to drill the hole in the first instance. Thus, as shown in FIG. 2A, the elongated shaft 22 is configured on one end with attachment means to engage a stopper plug assembly and is also configured on the same end with attachment means to engage a drill bit. In a preferred embodiment, the socket attachment means is comprised of internal threads and the drill bit attachment means is comprised of external threads. After a drill bit or hole saw cutter is placed on the elongated shaft, a hole can be drilled either by manually rotating the shaft with a handle 23 attached at the other end of the drill bit or by a power device attached at the end remote from the drill bit by socket nut 71. In an illustrative example, if the pipe P is a 2 inch diameter pipe, the gate valve V can be a 1 inch gate valve, and the hand cylinder drill can use an 11/16 inch drill bit.

After the drill has been removed and the gate valve has been closed, the uniformly circular hole through the pipe wall is ready for closure by means of the tool and stopper plug of the invention. The preparatory procedure described above for assuring that the hole is circular and of the desired diameter is not necessary in some cases, and is, of course, not employed in such cases.

FIG. 3 shows how the tool of the invention is used in conjunction with a valve temporarily secured to a pipe fitting for the insertion of a drill or hole saw cutter to create a hole or the insertion of a stopper plug to seal a hole in a fluid container which may be a pipe.

Figure 4:
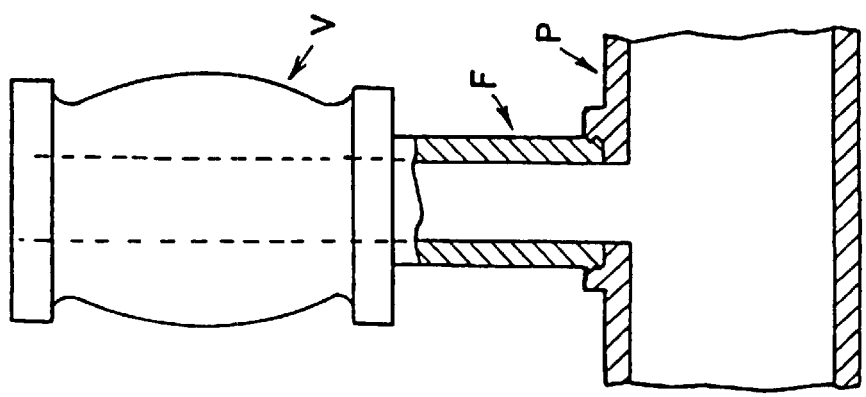
FIG. 4 is a view, partly in section, of a pipe section having a hole in the pipe side wall into which a stopper plug is to be inserted.

FIG. 4 illustrates the condition of the pipe section P, fitting F and gate valve V existing when the tool of the invention is to be used. The valve V is in closed position, so that gas can only escape from the pipe P and fitting F through a pre-existing leak.

Figure 6:
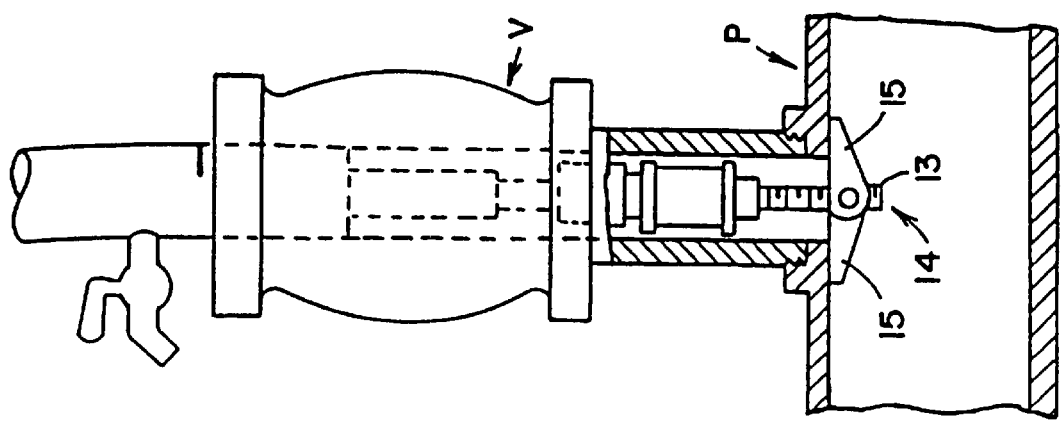
FIG. 6 is a view similar to those of FIGS. 4 and 5 and illustrating the operation of a toggle.
Figure 5:
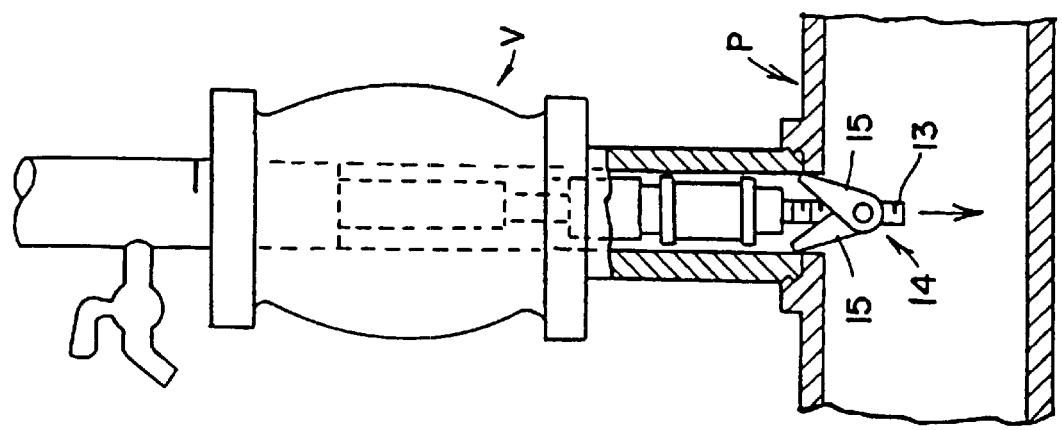
FIG. 5 is a view similar to that of FIG. 4 showing an intermediate stage in the process of inserting a stopper plug in accordance with the invention.

FIG. 2 shows an overall view of a tool according to the invention, generally designated by the reference numeral 10. The stopper plug assembly generally designated by reference numeral 11 is seen to be carried by the tool 10 in FIG. 2. The stopper plug assembly 11 has a compressible, elastomeric, generally cylindrical body 12 which can be made of rubber or some suitable synthetic material which is resistant to damage from the fluid carried in the pipe. The stopper plug body 12 is mounted on, and surrounds a threaded element 13 seen in FIG. 2 as extending above and below the body 12. Near the end of the threaded element 13 is a toggle or anchor 14 comprising two flanged wings 15 shown in FIG. 2 in their extended condition. The flanged wings 15 of the toggle 14 are pivotally mounted to extend from opposite sides of a nut (not shown in the drawings) to retract against the action of a spring (not shown) for passage through a hole in the pipe wall as seen in FIG. 5 and, after passage through the hole, to extend under the action of the spring as shown in FIG. 6. The toggle 14 can be of a well-known and readily commercially available type, having wings 15 of aluminum, steel or other rigid material that resists deterioration in the presence of natural gas or whatever other fluid is carried by the pipe P. The toggle 14 is chosen to be of appropriate size for the size of the pipe P and hole where it is to be employed. Thus, in the case of a two-inch diameter pipe, the spread wings 15 of the toggle 14 can preferably extend about two inches from tip to tip.

The body 12 of the stopper plug assembly 11 extends along the threaded member 13 between a lower or inner washer 16 and nut 17 and an upper or outer washer 18 and nut 19 as shown in FIG. 2. When the upper washer 18 and nut 19 are rotated while the lower washer 16 and nut 17 remain stationary, the upper washer 18 and nut 19 are tightened downwardly against the elastomeric body 12, compressing the body 12 in the axial direction and causing the body 12 to expand radially as seen in FIGS. 7, 8, 9 and 10.

Such compression of the stopper plug body 12 is effected by rotation of the threaded member 13 which is shown in FIG. 2 to be threadedly and removably mounted in a socket element 21 carried at the lower end of an elongated shaft 22. At its upper end the shaft 22 is secured to a handle 23 for manual rotation of the shaft 22.

In the embodiment of FIG. 2, the shaft 22 is rotatably enclosed within a tubular sleeve 24 which sleeve, in turn, is surrounded by a cylindrical outer housing 25. The outer housing 25 has external threads at its lower end 26 for securing the housing 25 to the internal threads of the gate valve V as illustrated in FIGS. 4–8. The upper or outer end of the housing 25 is fitted with a cap 27 surmounted by a collar 28 through which the tubular sleeve 24 extends. A suitable sealing gasket (not shown) prevents escape of gas through the cap 27 around the sleeve 24. A thumbscrew 29 extends radially through the collar 28 for locking the tubular sleeve 24 against motion relative to the cylindrical housing 25.

The tubular sleeve 24 has a handle 31 affixed to its upper end. A wing nut 32 encircles the shaft 22 above the handle 31 for securing the shaft 22 relative to the tubular sleeve 24.

Preferably, the outer housing 25 has a stopcock or bleeder valve 33 for exhausting gas from the interior of the housing 25 by opening the stopcock 33 by means of the handle 34 of the stopcock 33. As discussed above, this allows a safety check to determine whether the hole has been sealed as well as to reduce pressure and enable safe removal of the tool.

The tool 10 is used to insert and secure the stopper plug 11 to close a circular hole in a pipe wall, the hole having been drilled, if necessary, as described above. The external threads 26 of the outer housing are screwed into the receiving internal threads of the gate valve V which is secured atop the leaking fitting which is to be removed. At this time the gate valve V is in closed condition. Then the gate valve V is opened, as shown in FIG. 5, and the tubular sleeve 24 is pushed downward to insert the toggle 14 through the fitting F and the hole in the wall of the pipe P as shown in FIG. 5. When the toggle 14 has been inserted into the pipe P, the locking collar 28 is secured to the tubular sleeve by tightening the thumbscrew 29. The tubular sleeve 24 is now fixed in place. Next, the handle 23 is turned to retract the shaft 22 until the wings 15 of the toggle 14 are extended as shown in FIG. 6 and the toggle 14 is snugly in contact with the inner wall of the pipe section P.

The thumbscrew 29 is then loosened to release the tubular sleeve 24 and the sleeve 24 is lowered from the position shown in FIG. 6 to the position shown in FIG. 7. The handle 23 is used to hold the shaft 22 stationary while the tubular sleeve 24 is rotated to tighten the nut 19 down along with the washer 18 by rotating the socket 21. This compresses the elastomeric body 12 of the stopper plug assembly 11 in the axial direction and causes the elastomeric body 12 to expand radially within the fitting F as shown in FIG. 7. The expansion of the body 12 closes the internal passage of the fitting F.

The stopcock 33 is then opened, venting any gas contained within the housing 25. If leakage is continuing, gas will continue to escape from the stopcock and further remedial action will be called for. Normally, no further gas will escape after the small amount of gas under pressure within the housing 25 has escaped to the atmosphere. Venting through the stopcock further allows the tool 10 to be removed from the valve V without fear of a high pressure disengagement.

In one embodiment, a fluid bypass (not shown) is optionally provided to balance fluid pressure on either side of the drill face so that, in the case of high pressure fluids, the fluid pressure will not prevent the drill from being pushed against the surface to be drilled. Any means known for balancing the fluid pressure on either side of the drill bit or hole saw cutter can be used, including a fluid path directly through the drill bit or hole saw cutter or a fluid bypass that is entirely external to the fitting undergoing repair, such as, for example, a conduit connected from a separate fitting on the fluid container to the top of the housing 25. In the case of a conduit connected to the top of the housing 25, a flanged surface would be provided around the shaft 22 so that the bypass fluid is allowed to act downwardly on the shaft to assist in drilling. In a further embodiment, external fluid pressure could be provided, e.g., a noncombustible such as nitrogen, to the flanged surface that is equal to or greater than the pressure of the fluid in the container that is being drilled. It should also be appreciated that the embodiments shown in FIGS. 2A and 11 could also be configured with a fluid bypass in this manner.

The elastomeric body 12 of the stopper plug assembly 11 having been expanded to seal off the fitting F, the next step is to pull the tubular sleeve 24 upward by a distance sufficient to disengage the threaded member 13 from the socket 21. The thumbscrew 29 is tightened to prevent the sleeve 24 and shaft 22 from falling back. The situation at this point is illustrated by FIG. 8.

The stopper plug assembly 11 is now in place with the body 12 expanded to close the interior passage through the fitting F and with the toggle 14 securing the stopper plug near the wall of the pipe section P as shown in FIG. 9. The next step is to sever the fitting by use of a saw S just above the stopper body 12, as shown in FIG. 9, leaving the body 12 in place and removing the defective fitting F. A short stub portion F [1] remains in place on the pipe P. A piping saddle or clamp can then be secured around the pipe section P as shown in FIG. 10.

In summary, the hole plugging aspect of the invention is achieved by inserting an elastomeric stopper assembly into a hole to be plugged via the elongated shaft of the tool of the invention. The handle on the tool is then turned which causes the toggle to work its way up the threaded rod of the stopper assembly until it engages with a lock nut which is then held in place by the toggle. The nut then works its way up the rod as the handle is turned to expand the elastomeric plug and fill the hole. The tool is removed by unthreading the elongated shaft from the stopper assembly by turning the handle in the opposite direction from that used for the installation. The part of the stopper plug assembly above the plug itself is then cut off.

A typical conventional pipe saddle generally designated by reference numeral 35 is shown in FIG. 10 in place on the pipe section P at the location where the plug stopper 11 has been installed. The stub F [1] remaining after the fitting F has been severed and removed is shown to be enclosed within a generally cylindrical body 36 of the saddle 35. Flanges 37 extend from both sides of the saddle 36 and a U-shaped bar 38 placed around the pipe section P has ends that extend through the flanges 37 securing the saddle 35 in position with nuts 39. A solid plug 40 is threadedly received by the cylindrical saddle body 36. Even if the plug stopper 11 should fail, leakage at the repaired location cannot occur after the saddle 35 is fitted on the pipe section P.

A different embodiment of the combination drill and hole plugging tool of the invention is shown in FIG. 2A. In this embodiment, the housing 25 is sealed against entry of fluid at its lower end by seal 75 and packing nut 74 at its lower end and is also sealed to prevent escape of any fluid that does enter the housing at its upper end by seal 73 and packing nut 72. The seals 75 and 73 may be comprised of rubber o-rings, graphite rings or the like. In this embodiment, bleeder valve or stopcock 33 is situated between the hole to be drilled and/or plugged and the housing so that fluid can be vented from the fitting after a drilling or plugging procedure and before the tool is removed from the fitting.

It should be appreciated that the socket 21 shown in FIG. 2 is optional, as illustrated clearly by the absence of any such piece in FIG. 2A. Further, the wing nut 32, thumbscrew 29, tubular sleeve 24 and handle 31 are optional, as illustrated clearly by the absence of these components in the embodiment shown in FIG. 2A as well as the embodiment described below with respect to FIG. 11.

In still a further embodiment, threads 76 and 77 are provided at the lower end of the elongated shaft, as shown in FIG. 2A, for attachment to a drill bit hole saw cutter or stopper assembly. The threads may be either internal or external, or both. It should be appreciated that the embodiment shown in FIG. 2 may also use either internal or external threads, or both. It should be further appreciated that any attachment mechanism known in the art for attaching a drill bit or stopper assembly to a shaft could be used in any of the disclosed embodiments.

Figure 11:
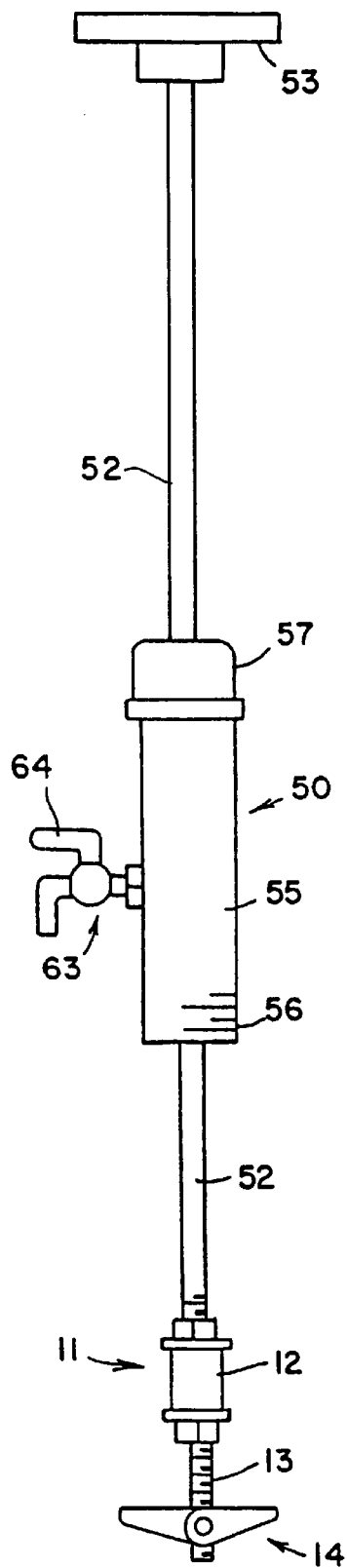
FIG. 11 is a side view of a further embodiment of the stopper plug tool aspect of the invention.
Figure 12:
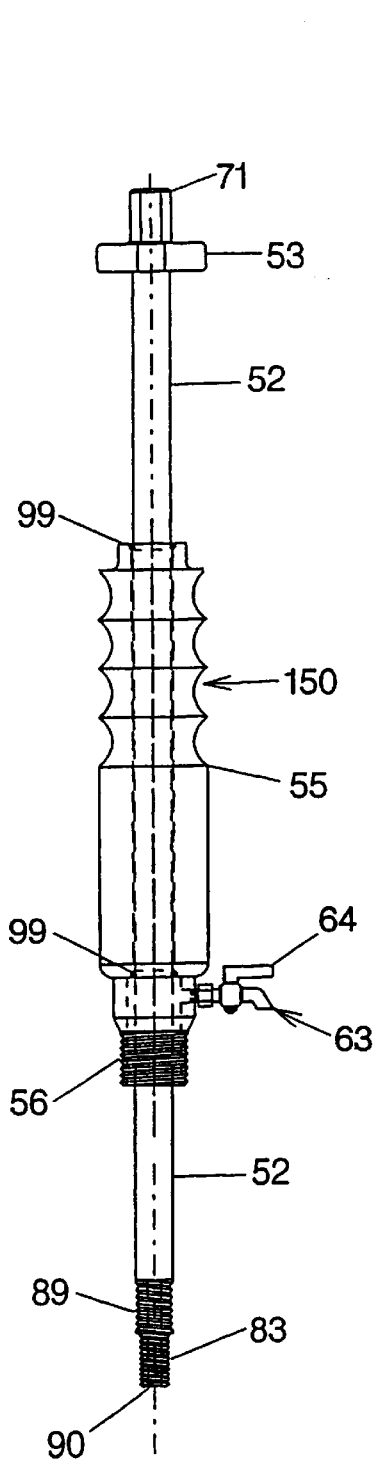
FIG. 12 is a side view of a farther embodiment of the combination drill and stopper installation tool.
Figure 13:
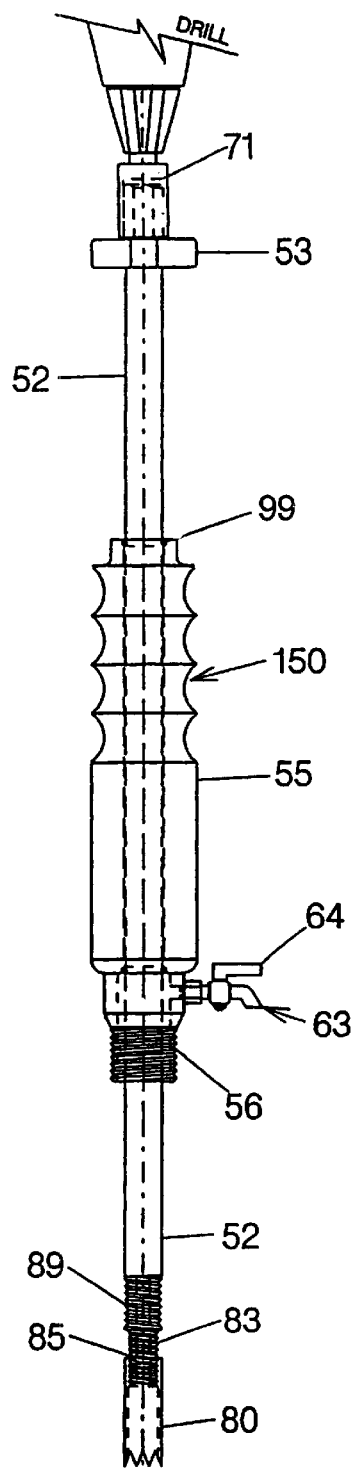
FIG. 13 is a side view of the combination drill and stopper installation tool depicted in FIG. 12 with a rotary hole saw cutter attached thereto.
Figure 14:
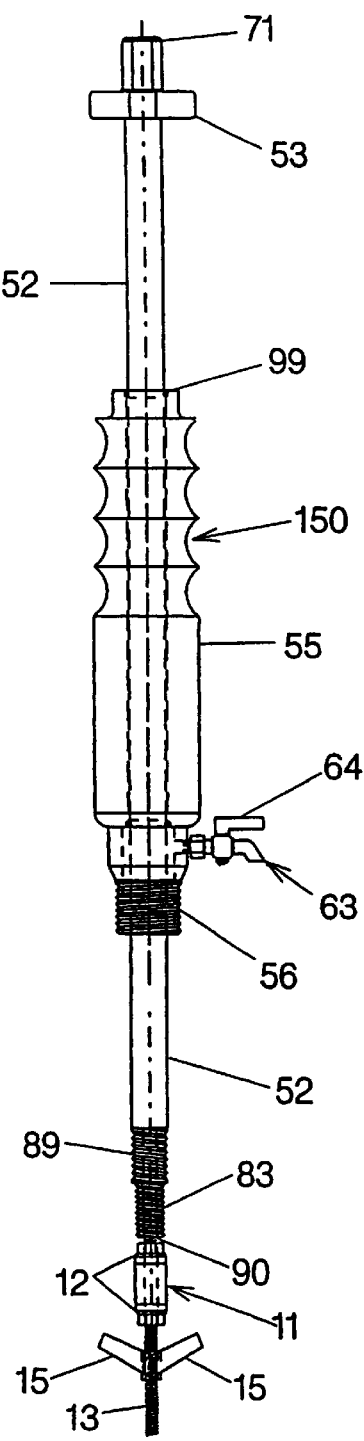
FIG. 14 is a side view of the combination drill and stopper installation tool depicted in FIG. 12 with the stopper assembly attached thereto.
Figure 15:
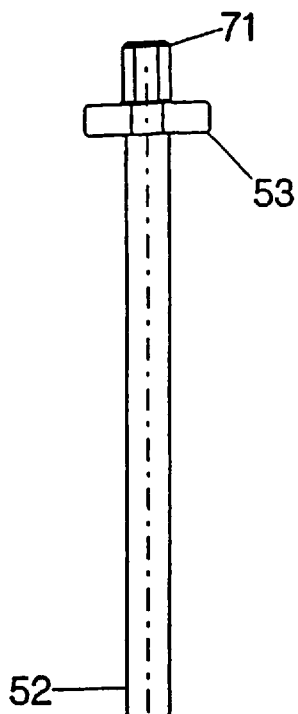
FIG. 15 is a side view of the elongated shaft of the combination drill and stopper installation tool depicted in FIG. 12.
Figure 19:
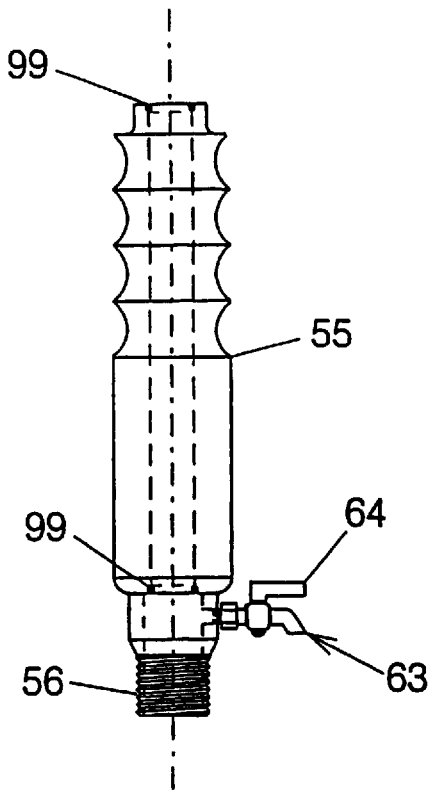
FIG. 19 is a side view of the housing of the combination drill and stopper installation tool depicted in FIG. 12.
Figure 17:
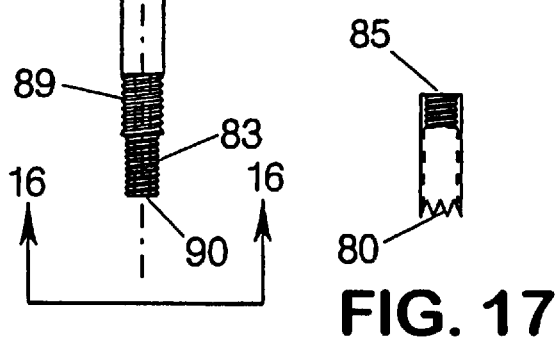
FIG. 17 is a side view of the rotary hole saw cutter.
Figure 18:
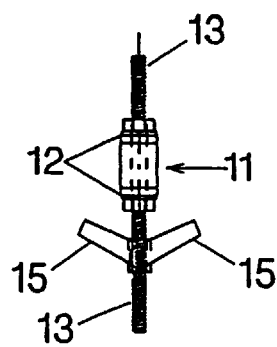
FIG. 18 is a side view of the stopper assembly.
Figure 16:
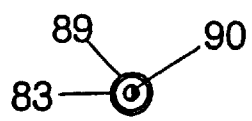
FIG. 16 is a bottom view of the elongated shaft taken from the position of line 16—16 of FIG. 15.

Another embodiment of the hole plugging tool aspect of the invention is shown in FIG. 11, where it is generally designated by reference numeral 50. In this embodiment, the tool 50 can be employed to install the same stopper plug assembly 11, with its compressible body 12, toggle 14, etc. that has been described in connection with the first embodiment 10 of the tool of the invention.

The tool 50 has an elongated shaft 52 like the shaft 22 of the tool 10. The shaft 52 terminates in a socket element 51 for receiving the threaded member 13 of the stopper plug assembly 11. However, the tool 50 does not have any element corresponding to the tubular sleeve 24 of the tool 10. The elongated shaft 52 fits directly within a cylindrical outer housing 55, is fitted at its upper end with a cap 57 through which the shaft 52 passes. A suitable sealing gasket (not shown) prevents the escape of fluid through the cap 57 around the shaft 52. The upper end of the shaft 52 is provided with a handle 53 for rotation of the shaft 52 relative to the housing 55.

Preferably, the housing 55 has a stopcock or bleeder valve 63 for exhausting gas from the interior of the housing 55 by opening the stopcock 63 by means of the stopcock handle 64 when the tool is used to place a stopper plug in a pipe carrying gas under pressure.

The use of the tool 50 shown in FIG. 11 is similar to that of the tool 10 of FIG. 2. A gate valve is installed on top of the fitting to be removed. If necessary, the hole through the pipe wall that opens into the fitting is made circular by using the hand cylinder drill of the invention as described above with respect to FIGS. 1 and 2A. In this regard, attachment means are situated at the lower end of the shaft 52 for attachment to a drill bit or rotary hole saw cutter. The attachment means may comprise internal or external threads or any other means known in the art for performing this function. Also, suitable attachment means may be incorporated at the top of the tool for attaching a power device for drilling a hole or expanding the stopper plug. The stopper tool 50 is mounted atop the gate valve, secured in place by the intermitting external threads at the lower end 56 of the housing 55 and the internal threads of the gate valve. The gate valve is then opened.

The stopper plug assembly 11 is pushed down into the pipe section by pushing the shaft 52 downwards. When the toggle wings have opened within the pipe, the shaft 52 is pulled upward seating the toggle 14 against the inner wall of the pipe.

The tool user then turns the shaft 52 by means of the handle 53 until resistance to further turning indicates that the body 12 of the stopper plug assembly 11 has expanded to close the hole against the escape of gas. Excessive tightening, as by the use of a wrench, should be avoided, since excessive force could damage the toggle 14.

The next step is to open the stopcock 63, venting gas from within the housing 55. Cessation of the escape of gas shows that the hole is sealed shut by the stopper plug 11.

The handle 53 is then turned to release the stopper plug assembly 11 from the shaft 52. Before rotating the shaft 52 to release the stopper plug, one may make a measurement of the distance the shaft is extended to determine the location of the stopper plug assembly 11 with respect to the fitting to be removed. After the shaft 52 has been retracted from the stopper plug assembly 11, any residual fluid pressure in the housing 55 is vented via stopcock 63 after which the housing 55 is unscrewed from its position atop the valve. The fitting is cut off just above the stopper plug body 12 as previously described with reference to the illustration of FIG. 9, and a saddle, clamp or sleeve is installed as illustrated with reference to the saddle 35 shown in FIG. 10.

An embodiment of the attachment means for interchangeably attaching a drill bit, a rotary hole saw cutter or a stopper assembly to the elongated shaft of the combination drill and stopper installation tool, is shown in FIGS. 12–21. In this embodiment, the tool 150 can be employed to install the same stopper plug assembly 11, with its compressible body 12, toggle 15, etc., that has been described in connection with the embodiments 10 and 50 of the tool of the invention. The tool 150 also can be used for tapping a circular hole in the main with a rotary hole saw cutter 80, or a drill bit (not shown) before the stopper plug assembly 11 is installed (see FIGS. 13 and 20).

The tool 150 has an elongated shaft 52 having at its lower end, attachment means for the removable attachment of a drill bit, a rotary hole saw cutter or a stopper assembly to the lower end of the elongated shaft 52. In this embodiment, the shaft 52 has female threads 90 at its lower end for receiving the threaded member 13 of the stopper plug assembly 11 (see FIGS. 14, 15, 16, and 18). The shaft 52 also has male threads 83 at the lower end for receiving female threads 85 of the hole saw cutter 80 (see FIGS. 13, 15 and 17). The shaft 52 also has larger diameter male threads 89 at its lower end portion, just above the smaller diameter male threads 83, for receiving female threads of a larger diameter hole saw cutter (not shown). The elongated shaft 52 fits directly within a cylindrical outer housing 55 having external threads at its lower end 56. Suitable sealing gaskets 99 are located at both ends of the cylinder to prevent the escape of the gas around the shaft 52.

The upper end of the shaft 52 is provided with a handle 53 and a socket connection 71 for rotation of the shaft 52 relative to the housing 55. Preferably the housing 55 has a stopcock or bleeder valve 63 for exhausting the gas from the interior of the housing 55 by opening the stopcock 63 by means of the stopcock handle 64 when the tool is used to place a stopper plug in pipe carrying gas under pressure.

Figure 20:
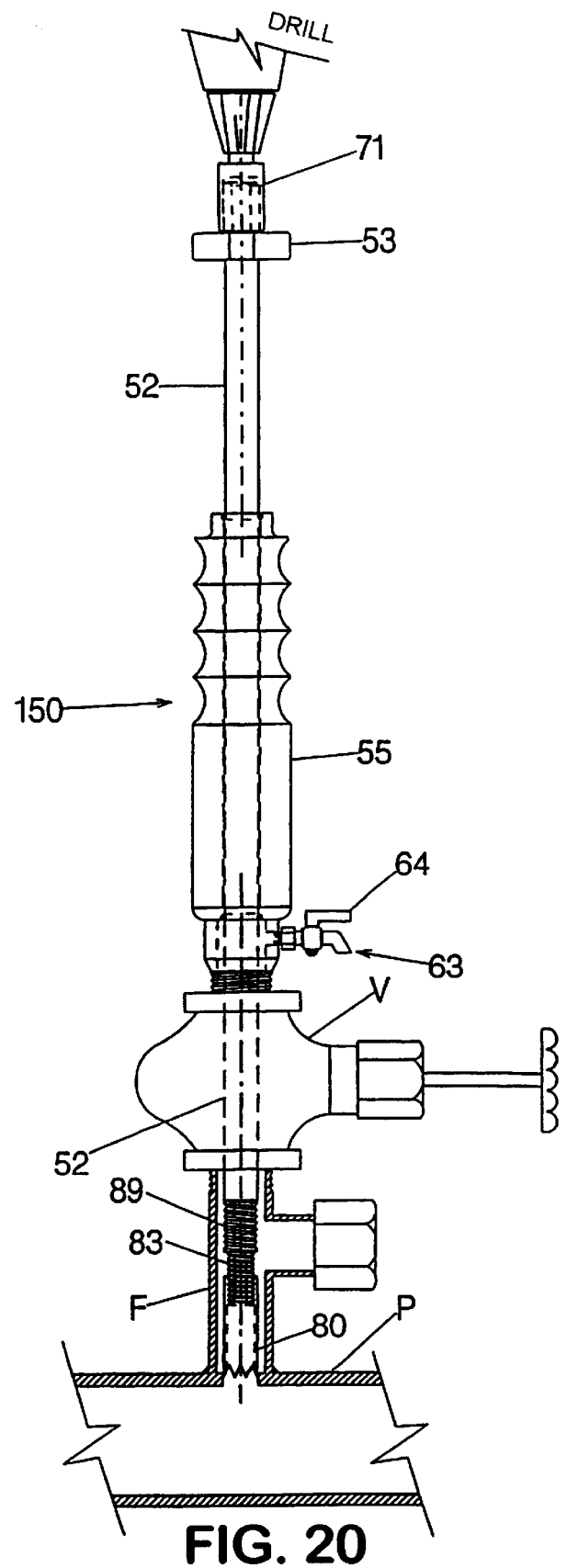
FIG. 20 is a view, partly in section, illustrating the cutting of a circular hole in a pipe section using the combination drill and stopper installation tool with the rotary hole saw cutter attached thereto.
Figure 21:
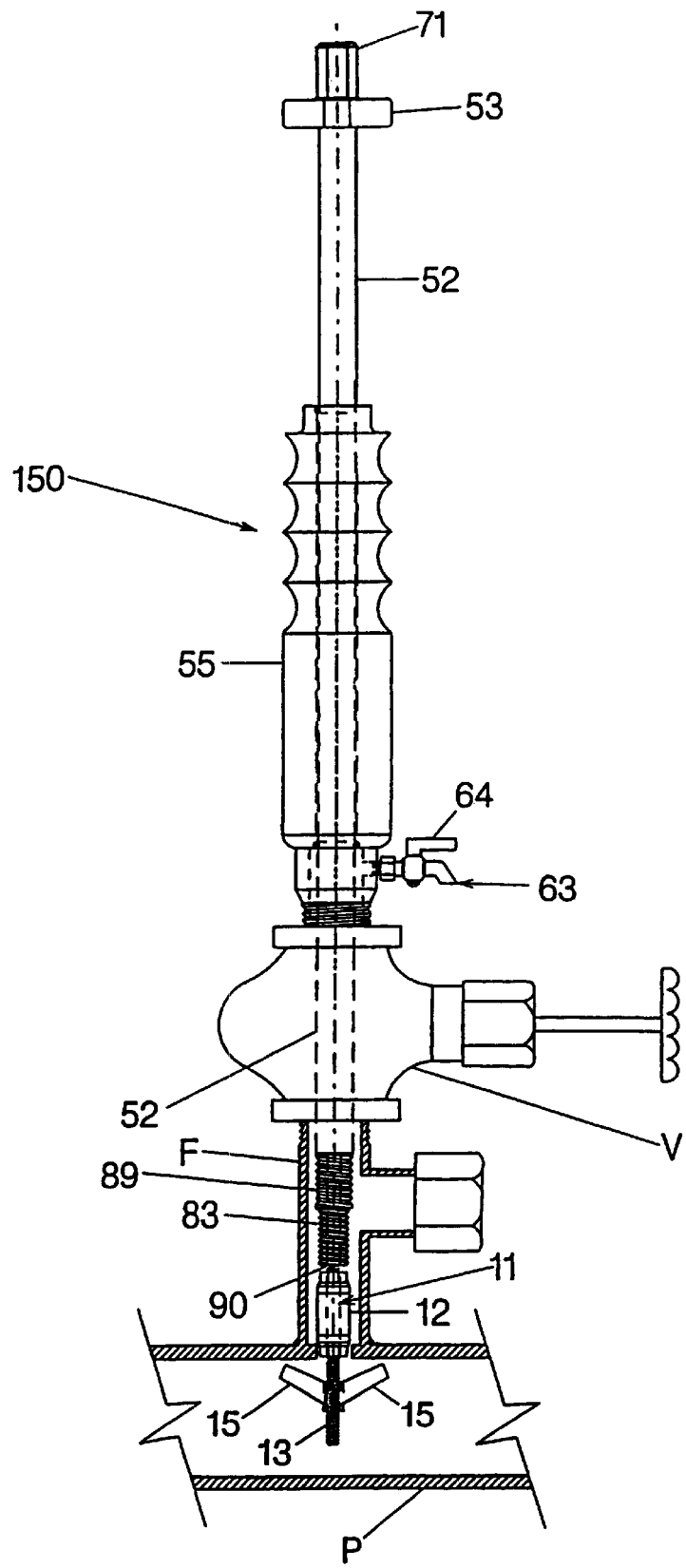
FIG. 21 is a view, partly in section, of a pipe during the process of inserting a stopper plug in a hole therein using the combination drill and stopper installation tool.

The use of the tool 150 is shown in FIGS. 20 and 21. A gate valve generally designated V of well known structure and function is installed on top of the fitting to be removed. If necessary, the hole through the pipe wall that opens into a fitting F is made circular by use of the combined tool 150. A hole saw cutter 80 is removably attached to the lower end of the shaft 52. The combined tool 150 is mounted atop the gate valve, secured in place by interfitting external threads 56 at the lower end of the housing 55 and the internal threads of the gate valve. The gate valve is then opened.

The user then pushes the shaft 52 downward until the rotary hole saw cutter 80 makes contact with the upper wall of the pipe P at the location where the stopper plug body 12 will enter the pipe. A drill is connected to the socket connection 71 located at the top of the shaft 52. The drill is then rotated clockwise with light pressure applied until the shaft 52 turns freely, which indicates that the hole saw cutter 80 has tapped through the pipe and a circular hole has been made. The shaft 52 is then pulled upwards through the gate valve, and the gate valve is closed. Next, the stopcock 63 is opened, thereby venting any gas from within the housing 55.

The drill is removed from the socket connection 71 and the tool 150 is disconnected from the top of the gate valve. The hole saw cutter 80 is removed from the male threads 83 at the lower end of shaft 52. The stopper plug assembly 11 is removably attached to the female threads 90 located at the lower end of shaft 52. The combined tool 150 is remounted atop the gate valve V, secured in place by interfitting external threads 56 at the lower end of the housing 55 and the internal threads of the gate valve. The gate valve is then opened.

The user then pushes the shaft 52 downward so as to push the stopper plug assembly 11 into the pipe section. When the toggle wings have opened within the pipe, the shaft 52 is pulled upward, thereby seating the toggle 15 against the inner wall of the pipe. The user then turns the shaft 52 by means of the handle 53 until resistance to further indicates that the body 12 of the stopper plug assembly 11 has expanded to close the hole against the escape of gas. Excessive tightening, as by the use of a wrench, should be avoided, since excessive force could damage the toggle 15.

The next step is to open the stopcock 63, venting gas from within the housing 55. Cessation of the escape of gas indicates that the hole is sealed shut by stopper plug assembly 11.

It is therefore apparent that the described apparatus has inherent advantages over the prior art. While certain preferred embodiments of the invention have been illustrated for the purpose of this disclosure, numerous changes in the arrangement and construction of parts or elements may be made by those skilled in the art, which changes are embodied within the scope and spirit of the present invention as defined by the appended claims.

What is claimed is:

1. A combination drill and stopper installation tool for drilling a circular hole in a sidewall of fluid conduit and for installing a stopper plug in the hole in order to close the hole against fluid leakage, the device comprising: an externally threaded element extending above and through a radially expansible body portion of the stopper plug for holding and positioning the stopper plug during installation of the plug within the circular hole in the sidewall of the fluid conduit, said externally threaded element being configured for removable attachment to one end of an elongated shaft; said elongated shaft is configured to interchangeably carry a drill bit for drilling a hole or a stopper plug for plugging a hole; wherein the elongated shaft detachable carries the drill bit when the circular hole is being drilled in the sidewall of the fluid conduit and, after the circular hole has been drilled, the drill bit is detached from the elongated shaft and the externally threaded element and stopper plug is attached to the elongated shaft; said elongated shaft is further configured for moving the externally threaded element and stopper plug linearly and rotationally by moving said shaft and said threaded element to position and sealingly engage the stopper plug within said hole; and a generally cylindrical housing through which the elongated shaft extends axially and slidably therein, said housing having a cap at one end through which said shaft extends and attachment means at an opposite housing end for securing the housing to a cylindrical member that defines said hole.

2. The device of claim 1 wherein the elongated shaft has internal threads, the threads being configured for removable engagement to the externally threaded element.

3. The device of claim 1 wherein the elongated shaft has external threads and the drill bit has internal threads, the threads being configured for removable engagement.

4. The device of claim 1 wherein the housing has means for sealing the housing against the escape of fluid and means for venting the housing to allow the escape of fluid.

5. The device of claim 4 wherein the means for venting the housing is a stopcock.

6. The device of claim 1, including a tubular sleeve surrounding the elongated shaft, the tubular sleeve extending coaxially with the elongated shaft through the housing.

7. The device of claim 6 wherein the tubular sleeve is mounted for axial movement with respect to the housing and including locking means for selectively securing the elongated shaft against movement with respect to the housing.

8. The device of claim 6 wherein the elongated shaft is mounted for sliding movement with respect to the tubular sleeve.

9. The device of claim 1 including a handle attached to another end of the shaft remote from the socket for manual rotation of the shaft.

10. The device of claim 1 wherein the housing has means for preventing the entry of fluid from the fluid container.

11. The device of claim 10 further including a stopcock situated between the fluid container and the means for preventing the entry of fluid from the fluid container, the stopcock allowing fluid pressure to be vented to the atmosphere.

12. The device of claim 1 further including a bypass valve for equilibrating fluid pressure on either side of a drill face, the drill face defined by the contact surface of the drill bit and material being drilled.

13. A method for repairing a defective fitting in a fluid conduit, wherein the fitting has a passage that extends at an angle to the axis of the fluid conduit to which the fitting is attached, using a combination drill and stopper installation tool for both drilling a circular in a sidewall of a fluid conduit and installing a stopper plug in the hole in order to a close the hole against fluid leakage, comprising:

drilling a circular hole the sidewall of the fluid conduit by rotating a drill bit attached to a lower end of an elongated shaft of the tool, within the passage in the fitting;

removing the drill bit and the elongate shaft from within the passage in the fitting and detaching the drill bit from the lower end of the elongated shaft of the tool;

attaching a stopper assembly having a radially expansible body portion to the lower end of the elongated shaft of the same tool that was used to drill the hole;

inserting the lower end of the elongated shaft and stopper assembly into the hole;

locating the stopper assembly having a radially expansible body portion within the hole in the sidewall of the fluid conduit via the elongated shaft;

turning a handly on the other end of the elongated shaft so that a toggle on the stopper assembly is forced toward the radially expansible body portion of the stopper assembly, the toggle causing the radially expansible body portion of the stopper assembly to expand as the elongated shaft is turned, until the stopper assembly is sealingly engaged with the sidewall of the fluid conduit so as to close the hole against fluid leakage;

detaching the elongated shaft from the stopper assembly that is sealingly engaged within the circular hole in the sidewall of the fluid conduit; and removing the defective fitting from the fluid conduit while leaving the stopper assembly in position wherein a portion of the fitting is removed by severing the fitting passage while leaving a stub of the fitting passage on the fluid conduit around the stopper assembly, secured a clamping device around the stub of the fitting passage, with closure means secured at one end of the clamping device for preventing any fluid leakage that may leak past the stopper assembly.

14. The method of claim 13 wherein the insertion of a stopper plug comprises using a stopper plug assembly having an externally threaded element, the externally threaded element extending above and through said radially expansible body of the stopper plug for holding and positioning the stopper plug during installation of the plug; said externally threaded element being configured for removable attachment to one end of an elongated shaft; said elongated shaft being configured for carrying the externally threaded element and stopper plug for moving the externally threaded element and stopper plug linearly and rotationally by moving said shaft and said threaded element to position and secure the stopper plug within said hole; said elongated shaft being configured for carrying a drill bit to drill a hole in a sealed fluid container; a generally cylindrical housing through which the elongated shaft extends axially and slidably therein, said housing having a cap at one end through which said shaft extends and attachment means at an opposite housing end for securing the housing to a cylindrical member that defines said hole; wherein said elongated shaft is configured to interchangeably carry a drill bit for drilling a hole or a socket element, externally threaded element and stopper plug for plugging a hole.

15. The method of claim 14 wherein the elongated shaft has internal threads and the socket element has external threads, the threads being configured for removable engagement.

16. The method of claim 14 wherein the elongated shaft has external threads and the drill bit has internal threads, the threads being configured for removable engagement.

17. The method of claim 14 wherein the housing has means for sealing the housing against the escape of fluid and means for venting the housing to allow the escape of fluid.

18. The method of claim 17 wherein the means for venting the housing is a stopcock.

19. The method of claim 14 wherein the housing has means for preventing the entry of fluid from the fluid container.

20. The method of claim 19 further including a stopcock situated between the fluid container and the means for preventing the entry of fluid from the fluid container, the stopcock allowing high pressure fluid to be vented to the atmosphere.

21. A combination drill and installation tool for both drilling a circular hole in a sidewall of a fluid conduit and installing a radially expansible stopper plug in the hole in order to close the hole against fluid leakage, the tool comprising:

a generally cylindrical housing having a vertically aligned bore extending through the housing;

an elongated shaft extending axially through the bore in the housing and slidably therein, the elongated shaft having at its upper end a handle for manual rotation of the shaft and a socket connection engageable with a drill for powered rotation of the shaft, and the elongated shaft having at its lower end attachment means for interchangeably attaching a cutting member or the radially expansive stopper plug to the lower end of elongated shaft, wherein the cutting member is detached from the lower end of the elongated shaft after the circular hole is drilled in the sidewall of the fluid conduit and radially expansible stopper plug is then attached to the lower end of the elongated shaft, the elongated shaft can be moved linearly and rotationally with the cutting member attached to its lower end to drill the circular hole and can be moved linearly and rotationally with the radially expansible stopper plug attached to its lower end to position the stopper plug within the hole and to radially expand the stopper plug so as to secure the stopper plug within the hole;

a first seal disposed proximal to the lower end of the cylindrical housing to seal against the entry of fluid into the bore extending through the housing, a second seal disposed at the upper end of the cylindrical housing to seal against the escape of any fluid that enters into the bore extending through the housing; and venting means for venting the housing of any fluid.

22. The combination drill and stopper installation tool of claim 21 wherein cutting member has a female threaded portion, the stopper plug has a male threaded portion, and the attachment means comprises a male threaded portion at the lower end of the elongated shaft threadedly engageable with the female threaded portion of the cutting member and a female threaded portion at the lower end of the elongated shaft threadedly engageable with the male threaded portion of the stopper plug.

23. The combination drill and stopper installation tool of claim 22 wherein the cutting member is a rotary hole saw cutter.

* * * * *

UNITED STATES PATENT AND TRADEMARK OFFICE
CERTIFICATE OF CORRECTION

PATENT NO.    : 6,446,662 B1
DATED         : September 10, 2002
INVENTOR(S)   : Wagner It is certified that error appears in the above-identified patent and that said Letters Patent is hereby corrected as shown below:

Column 4,
Line 14, please delete "farther" and insert therefor -- further --.

Column 11,
Line 14, please delete "shaft detachable carries" and insert therefor -- shaft detachably carries --;

Column 12,
Line 2, please delete "to a close" and insert therefor -- to close --;
Line 33, please delete "assembly, secured" and insert therefor -- assembly, securing --;

Column 13,
Line 28, please delete "radially expansive stopper" and insert therefor -- radially expansible stopper --;

Column 14,
Line 1, please delete "and radially" and insert therefor -- and the radially --;
Line 13, please delete "housing," and insert therefor -- housing; --.

Signed and Sealed this

Fourth Day of February, 2003

JAMES E. ROGAN
*Director of the United States Patent and Trademark Office*